US011641037B2

(12) United States Patent
Chen et al.

(10) Patent No.: US 11,641,037 B2
(45) Date of Patent: May 2, 2023

(54) BATTERY MODULE

(71) Applicant: Contemporary Amperex Technology Co., Limited, Fujian (CN)

(72) Inventors: Shaozhen Chen, Zhangwan Town (CN); Lilei Su, Zhangwan Town (CN); Renwei Zheng, Zhangwan Town (CN); Zhiming Chen, Zhangwan Town (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 222 days.

(21) Appl. No.: 16/540,363

(22) Filed: Aug. 14, 2019

(65) Prior Publication Data
US 2020/0203684 A1 Jun. 25, 2020

(30) Foreign Application Priority Data

Dec. 23, 2018 (CN) .......................... 201811576923.6

(51) Int. Cl.
H01M 10/613 (2014.01)
H01M 50/291 (2021.01)
(Continued)

(52) U.S. Cl.
CPC ....... *H01M 10/613* (2015.04); *H01M 50/209* (2021.01); *H01M 50/291* (2021.01); *H01M 50/293* (2021.01)

(58) Field of Classification Search
CPC ...... H01M 50/20; H01M 50/24; H01M 50/40; H01M 10/613; H01M 2220/20; H01M 10/625; H01M 10/6554; Y02E 60/10
See application file for complete search history.

(56) References Cited

U.S. PATENT DOCUMENTS

2007/0133151 A1* 6/2007 Jeon .................. H01M 10/6563
361/600
2008/0124622 A1* 5/2008 Hamada ................ H01M 50/20
429/149
(Continued)

FOREIGN PATENT DOCUMENTS

CN 104140024 A 11/2014
CN 104975770 A 10/2015
(Continued)

OTHER PUBLICATIONS

Eglish Translation of JP2012/113898.*
(Continued)

*Primary Examiner* — Kiran Quraishi Akhtar
(74) *Attorney, Agent, or Firm* — Kilpatrick Townsend & Stockton LLP

(57) ABSTRACT

The present disclosure provides a battery module including a plurality of batteries arranged sequentially in a length direction and a cushion pad disposed between two adjacent batteries in the length direction. The cushion pad can include a main body portion and an extending portion extending outwardly from an end surface of the main body portion in a height direction. The extending portion can include a pair of convex portions and a concave portion between the pair of convex portions. The design can ensure that the cushion pad does not exceed the corresponding surface of the battery in the height direction when pressed, and thus does not affect the flatness of the corresponding surface of the battery.

12 Claims, 10 Drawing Sheets

(51) Int. Cl.
*H01M 50/293* (2021.01)
*H01M 50/209* (2021.01)

(56) References Cited

U.S. PATENT DOCUMENTS

| | | | | |
|---|---|---|---|---|
| 2009/0142653 A1* | 6/2009 | Okada | ................. | H01M 10/647 |
| | | | | 429/120 |
| 2012/0214038 A1 | 8/2012 | Kim et al. | | |
| 2014/0023893 A1* | 1/2014 | Shimizu | ................ | H01M 50/20 |
| | | | | 429/72 |
| 2014/0302378 A1 | 10/2014 | Tsuruta et al. | | |
| 2015/0104683 A1* | 4/2015 | Lundstrom | ......... | H01M 10/625 |
| | | | | 429/61 |

FOREIGN PATENT DOCUMENTS

| | | | |
|---|---|---|---|
| CN | 205278083 U | 6/2016 | |
| CN | 206250240 U | 6/2017 | |
| CN | 207398223 U | 5/2018 | |
| CN | 207834396 | 12/2018 | |
| CN | 208248000 | 12/2018 | |
| CN | 208248506 | 12/2018 | |
| CN | 208249880 | 12/2018 | |
| CN | 208254283 | 12/2018 | |
| CN | 208254396 | 12/2018 | |
| CN | 208255328 | 12/2018 | |
| CN | 208256089 | 12/2018 | |
| CN | 208256758 | 12/2018 | |
| CN | 208256760 | 12/2018 | |
| CN | 208256761 | 12/2018 | |
| CN | 208256763 | 12/2018 | |
| CN | 208256764 | 12/2018 | |
| CN | 208256790 | 12/2018 | |
| CN | 208256805 | 12/2018 | |
| CN | 208256856 | 12/2018 | |
| CN | 208256868 | 12/2018 | |
| CN | 208256945 | 12/2018 | |
| CN | 208526762 | 12/2018 | |
| CN | 208797084 | 4/2019 | |
| CN | 208955062 U | 6/2019 | |
| CN | 208955063 U | 6/2019 | |
| CN | 209104221 U | 7/2019 | |
| EP | 1852924 A1 | 11/2007 | |
| JP | 2009110833 A | 5/2009 | |
| JP | 2012/113898 | * 6/2012 | ............. H01M 2/10 |
| JP | 2014220234 A | 11/2014 | |
| JP | 2015185463 A | 10/2015 | |
| JP | 2018056957 A | 4/2018 | |
| WO | 2006087962 A1 | 7/2008 | |
| WO | 2019/181502 A1 | 9/2019 | |

OTHER PUBLICATIONS

International Application No. PCT/CN2019/123693 International Search Report of the International Searching Authority, dated Feb. 25, 2020, 3 pages.
International Application No. PCT/CN2019/123693 Written Opinion of the International Searching Authority, dated Feb. 25, 2020, 3 pages.
European Search Report in EP Application No. 19203873.5 dated May 25, 2020, 11 pages.
First Office Action received in the counterpart JP application No. 2019-224222.
Decision to Grant a Patent of the counterpart JP application No. 2019-224222.

* cited by examiner

BATTERY MODULE

PRIORITY

This application claims priority to C. N. Application No. CN201811576923.6 filed on Dec. 23, 2018, which is incorporated by reference herein.

FIELD

The present disclosure relates to the field of batteries, and in particular to a battery module.

BACKGROUND

In the design of a battery module, a cushion pad is provided as a buffering material between the batteries. The existing cushion pad usually has a rectangular shape or a frame shape with an opening in the middle. In this case, when the surface of the cushion is pressed, the end surface of the cushion in the height direction may exceed the surface of the battery in the height direction, thereby affecting the external dimension of the battery module and the flatness of the surface of the battery in the height direction. On the one hand, in the case where the bottom of the battery module needs to be glued, if an existing type of cushion pad is used, the cushion pad would be pressed between the batteries by an assembly force of the battery module, and the cushion pad may be pressed outward from the bottom surface of the battery in the height direction, which can cause problems including that bottom of the battery module is uneven, the height of the adhesive layer is not uniform, resulting in inconsistent bonding strength of the battery, which will shorten the service life of the battery module. On the other hand, in the case where a heat exchange plate is disposed at the bottom of the battery module for heat exchange of the battery, if the cushion pad exceeds the bottom surface of the battery in the height direction, the bottom of the battery module is uneven, which will affect the heat exchange efficiency of the battery module.

Therefore, there is a need for a battery module that does not affect the flatness of the corresponding surface(s) of the battery in the height direction.

SUMMARY

Disclosed herein is a battery module including a plurality of batteries arranged sequentially in a length direction and a cushion pad disposed between two adjacent batteries in the length direction. The cushion pad can include a main body portion and an extending portion extending outwardly from an end surface of the main body portion in a height direction. The extending portion can include a pair of convex portions arranged in a width direction from two sides of the extending portion and protruding outwardly in the height direction, as well as a concave portion located between the pair of convex portions and recessed inwardly in the height direction with respect to the pair of convex portions.

In some embodiments, a surface of the concave portion can be a curved surface or a flat surface.

In some embodiments, a chamfer or a rounded corner can be provided between the convex portion and the concave portion.

In some embodiments, an angle between an end surface of the main body portion in the height direction and the extending portion is not more than about 90°.

In some embodiment, a chamfer or a rounded corner can be provided between the end surface of the main body portion and the extending portion in the height direction.

In some embodiments, the height at which the concave portion recesses inward in the height direction can be smaller than the height at which the convex portion protrudes from the end surface of the main body portion in the height direction.

In some embodiments, an outer surface of the convex portion can be a curved surface.

In some embodiments, the extending portion can be arranged on the end surface on a lower side of the main body portion in the height direction. In some embodiments, the extending portion can be arranged on the end surface on an upper side of the main body portion in the height direction.

In some embodiments, the end surface on the upper side of the main body portion in the height direction and the end surface on the lower side of the main body portion in the height direction can each be provided with an extending portion.

In some embodiments, the extending portion arranged on the end surface on the upper side of the main body portion in the height direction and the extending portion arranged on the end surface on the lower side of the main body portion in the height direction can be in mirror symmetry with respect to the main body portion.

In some embodiments, the battery module can include a heat exchange plate disposed and fixed to a lower side of the plurality of batteries in the height direction.

In some embodiments, an apex of the convex portion does not exceed a corresponding surface of the battery in the height direction.

Also disclosed herein is a method of maintaining flatness of a surface of a battery module in a height direction, the method can include disposing a cushion pad between two adjacent batteries in a plurality of batteries arranged sequentially in a length direction. The cushion pad can include a main body portion and an extending portion extending outwardly from an end surface of the main body portion in a height direction. The extending portion of the cushion pad can further include a pair of convex portions arranged in a width direction from two sides of the extending portion and protruding outwardly in the height direction, and a concave portion located between the pair of convex portions and recessed inwardly in the height direction with respect to the pair of convex portions.

When the cushion pad is subjected to a pressing force in the length direction, the pressing force received by the cushion pad is concentrated at the concave portion and the convex portion of the extending portion, the concave portion of the extending portion is deformed by the force to protrude outward, and the convex portions on both sides of the concave portion are deformed in the width direction as pressed by the concave portion, and the deformation is larger than the overall deformation of the cushion pad in the height direction, so that the cushion pad does not exceed the corresponding surface of the battery in the height direction. Thus, it does not affect the flatness of the corresponding surface of the battery in the height direction.

Further disclosed herein is a method of manufacturing a battery module, the method can include arranging a plurality of batteries sequentially in a length direction and disposing a cushion pad between two adjacent batteries in the length direction. The cushion pad can include a main body portion and an extending portion extending outwardly from an end surface of the main body portion in a height direction. The extending portion of the cushion pad can further include a pair of convex portions arranged in a width direction from two sides of the extending portion and protruding outwardly in the height direction, and a concave portion located between the pair of convex portions and recessed inwardly in the height direction with respect to the pair of convex portions.

BRIEF DESCRIPTION OF DRAWINGS

In order to facilitate a full understanding of the present disclosure, reference is now made to the accompanying drawings, in which like elements are referenced with like numerals. These drawings should not be construed as limiting the present disclosure, but are intended to be illustrative only. The drawings are not necessarily to scale, or inclusive of all elements of a system, emphasis instead generally being placed upon illustrating the concepts, structures, and techniques sought to be protected herein.

DESCRIPTION

Figure 1:
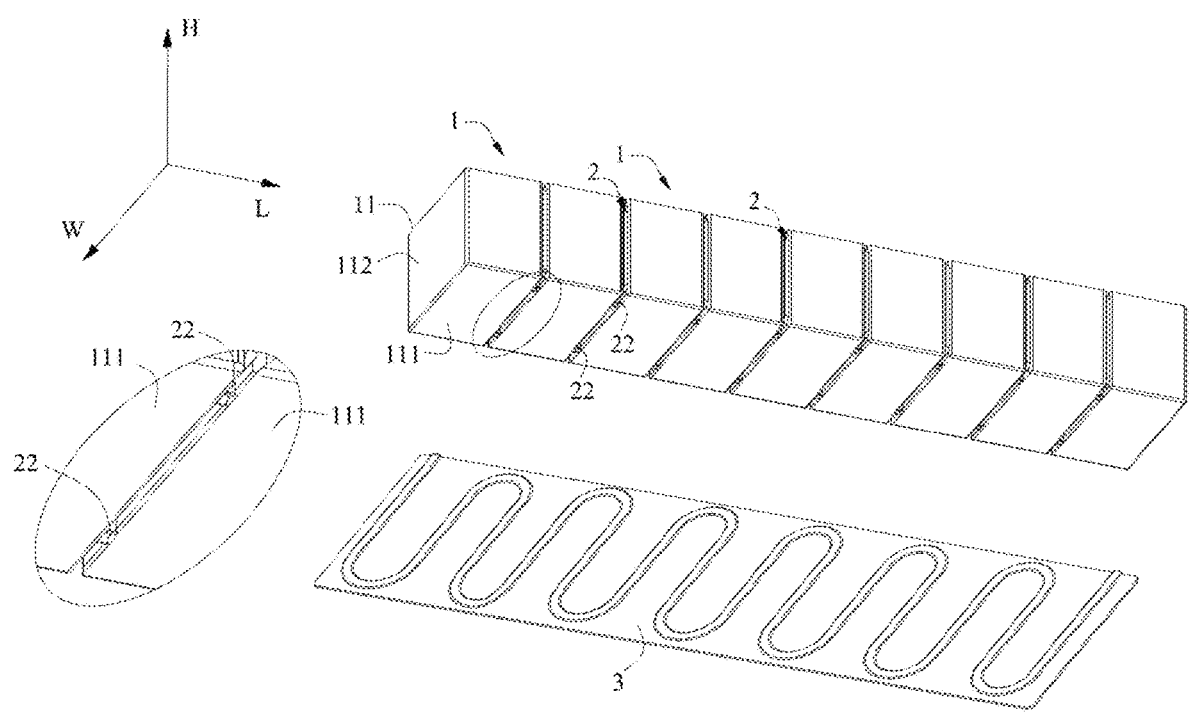
FIG. 1 is a partial exploded perspective view of a battery module, according to some embodiments of the present disclosure.

The battery module according to the present disclosure will be further described in detail with reference to the accompanying drawings.

The elements in the figures are described in the following:
1: battery
11: casing
111: bottom surface
112: large surface
12: top cover
121: top surface
13: electrode
14: explosion-proof valve
2: cushion pad
21: main body portion
211: end surface
22: extending portion
221: concave portion
222: convex portion
3: heat exchange plate
G: notch
L: length direction
H: height direction
W: width direction
P: Apex
H1: height
H2: height The accompanying drawings illustrate the embodiments of the present disclosure, and it is understood that the disclosed embodiments are only a few examples of the present disclosure. The present disclosure can be implemented in many different ways. Therefore, the specific details disclosed herein should not to be construed as limiting the present disclosure. Rather, they are only intended to be a basis of the claims and as a basis of representation for teaching a person of ordinary skill in the art to implement the present disclosure in different ways.

In this description, it is to be understood that the words "upper", "lower", and the like are described from the view angle showing the drawings, and should not be construed as limiting the embodiments of the present application.

The present disclosure has the following beneficial effects: when the cushion pad is subjected to a pressing force in the length direction, the pressing force received by the cushion pad is concentrated at the concave portion and the convex portion of the extending portion, the concave portion of the extending portion is deformed by the force to protrude outward, and the convex portions on both sides of the concave portion are deformed in the width direction as pressed by the concave portion, and the deformation is larger than the overall deformation of the cushion pad in the height direction, so that the cushion pad does not exceed the corresponding surface of the battery in the height direction. Thus it does not affect the flatness of the corresponding surface of the battery in the height direction.

Figure 2:
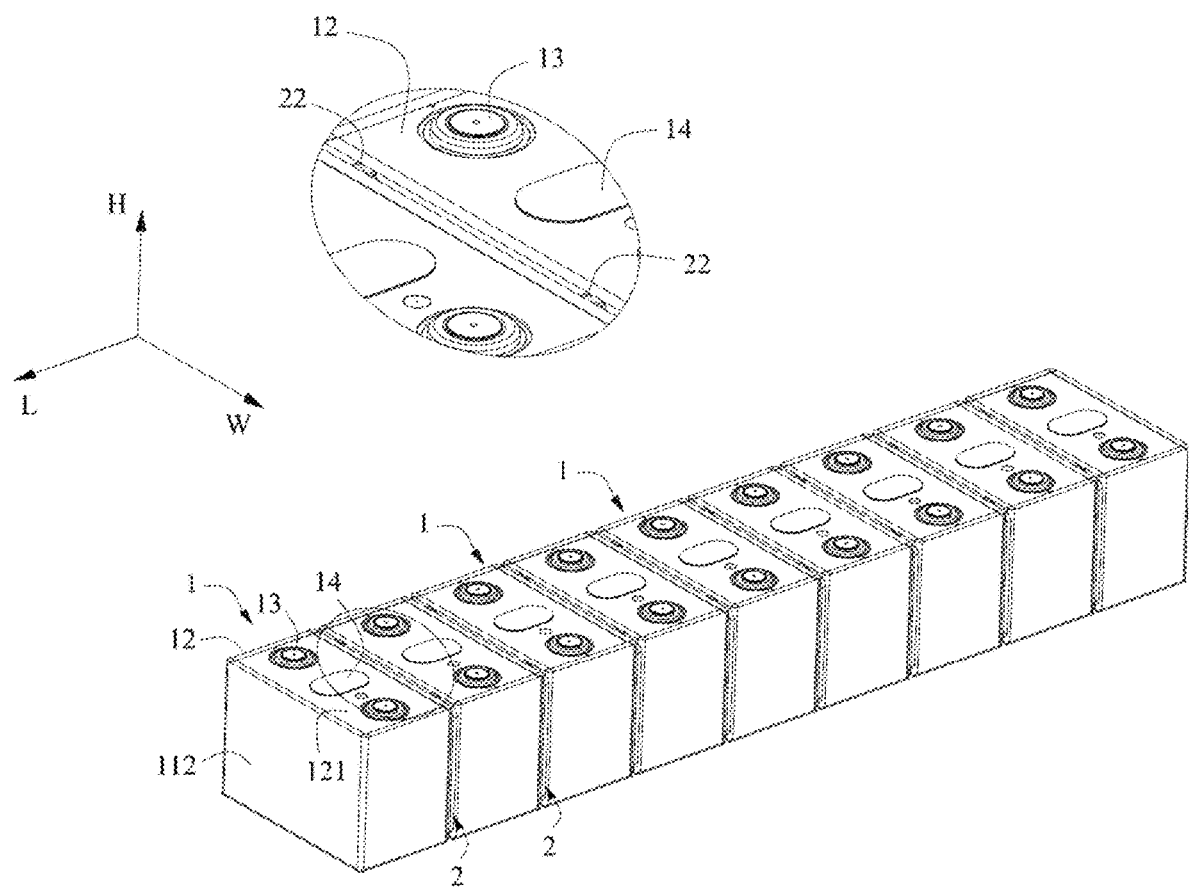
FIG. 2 is a perspective view of the battery module from FIG. 1 in another view angle in which the heat exchange plate is not shown, according to some embodiments of the present disclosure.
Figure 3:
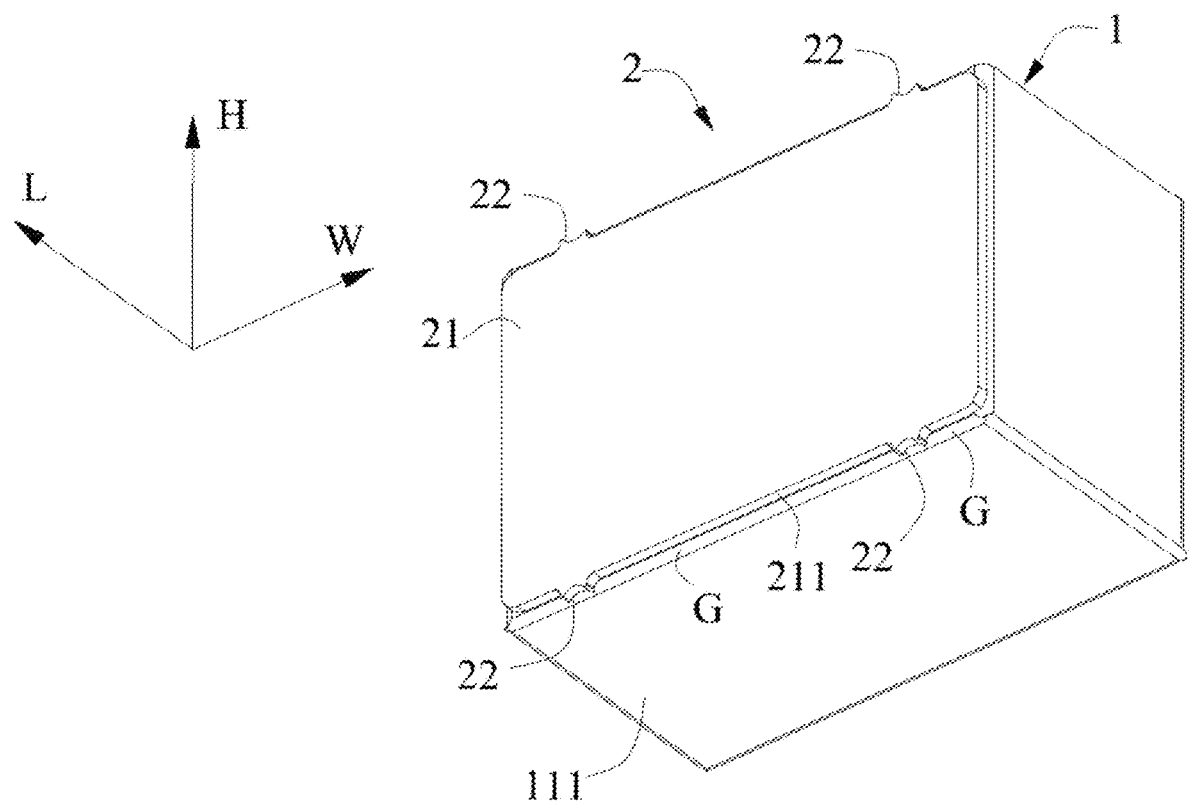
FIG. 3 a perspective view of the assembled battery and cushion pad of the battery module shown in FIG. 1, according to some embodiments of the present disclosure.
Figure 4:
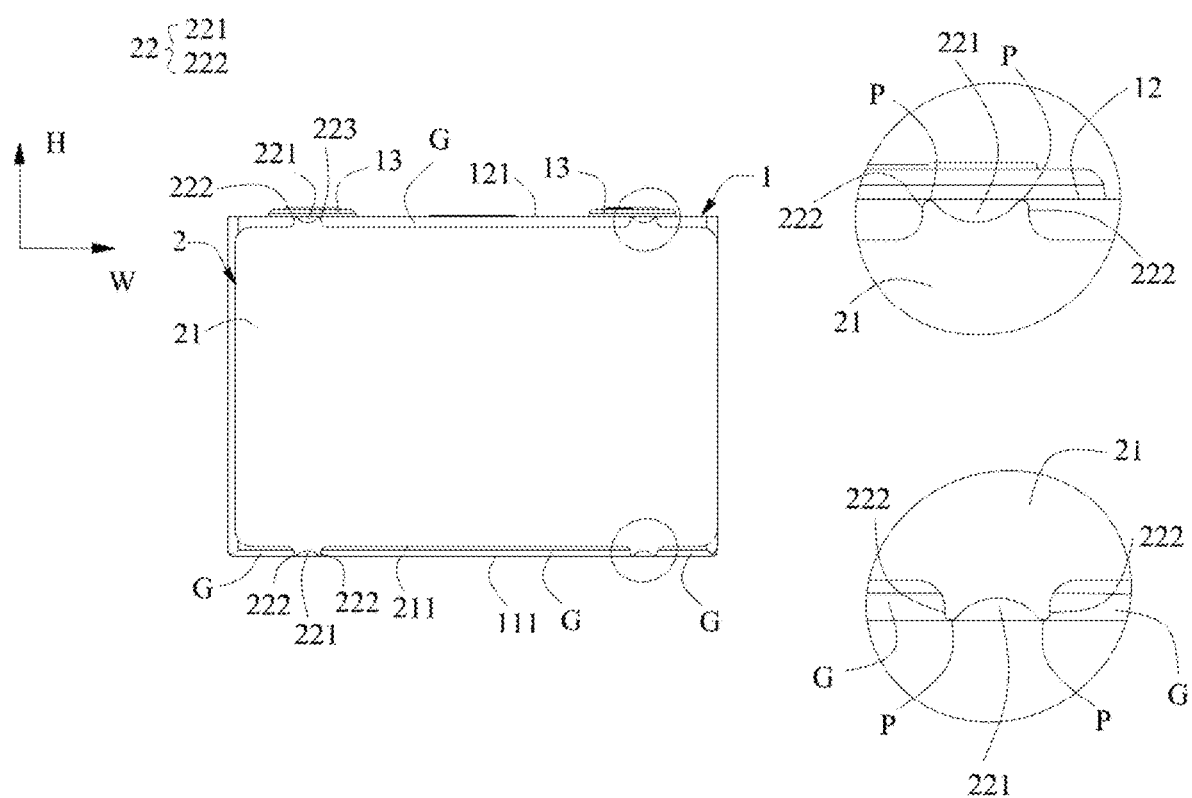
FIG. 4 is a side view of the battery module shown in FIG. 3, according to some embodiments of the present disclosure.
Figure 5:
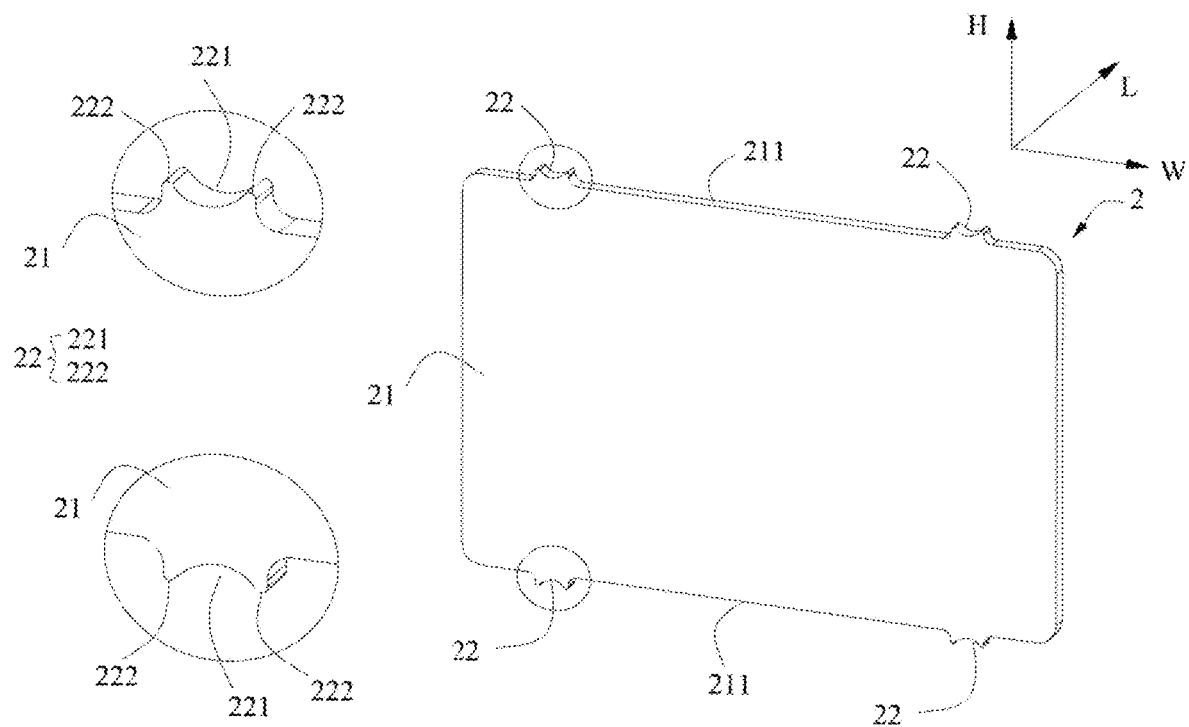
FIG. 5 is a perspective view of a cushion pad in the battery module shown in FIG. 1, according to some embodiments of the present disclosure.
Figure 6:
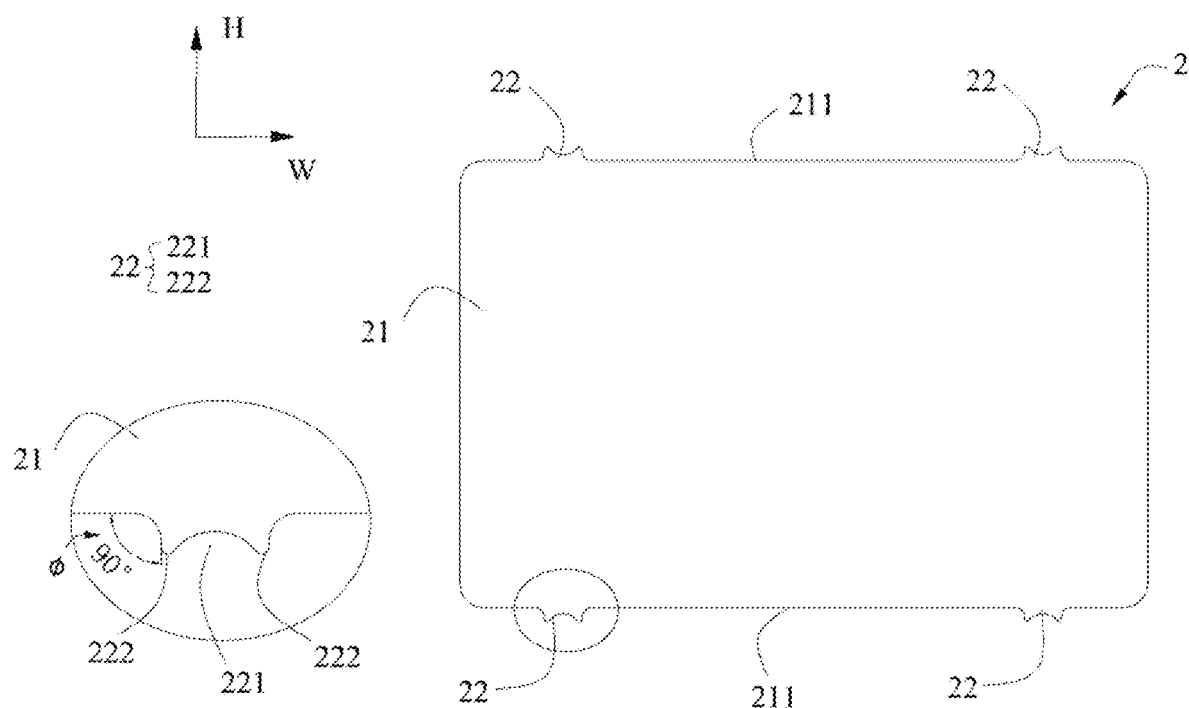
FIG. 6 is a planar view of the cushion pad in the battery module shown in FIG. 5, according to some embodiments of the present disclosure.
Figure 7:
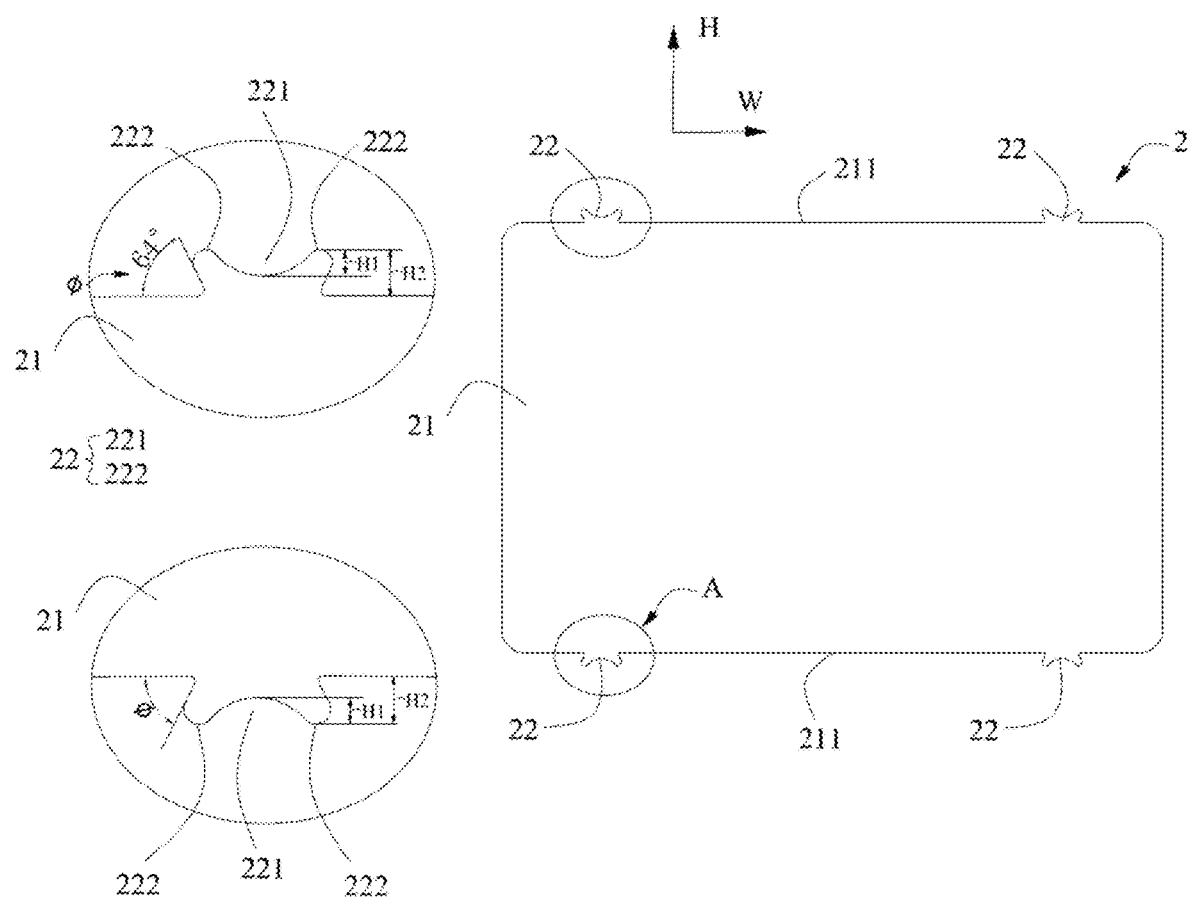
FIG. 7 is a planar view of the cushion pad in a battery module, according to some embodiments of the present disclosure.
Figure 8:
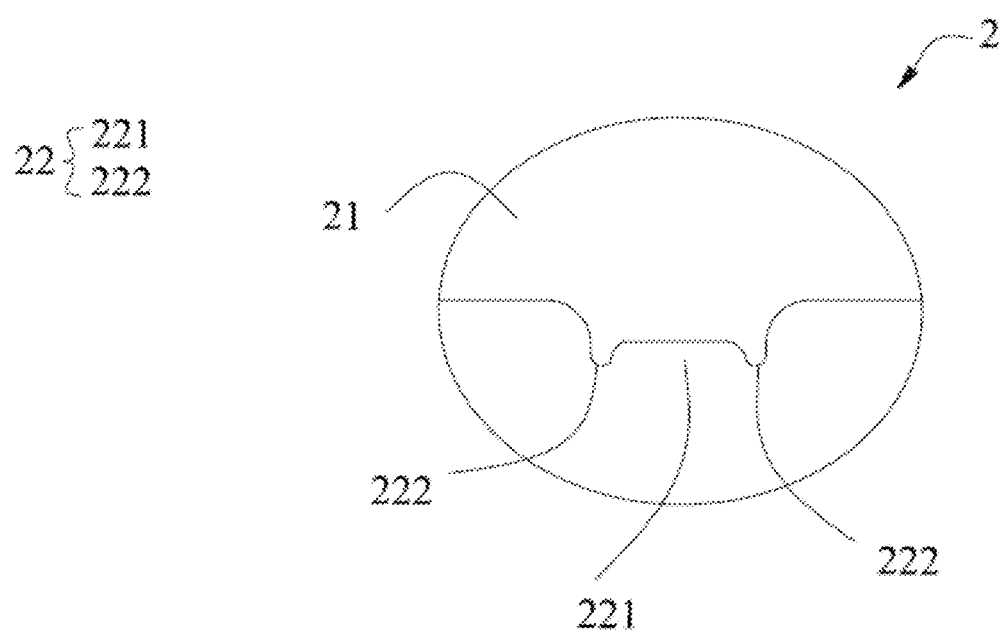
FIG. 8 is an enlarged view of portion A shown in FIG. 7, showing a modified extending portion of the cushion pad in the battery module, according to some embodiments of the present disclosure.
Figure 9:
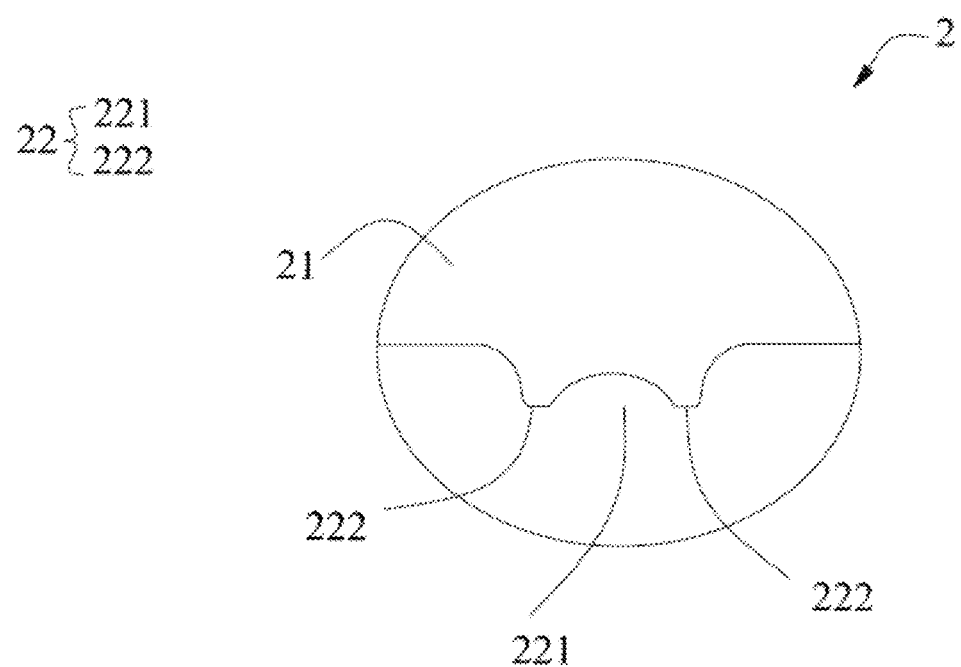
FIG. 9 is an enlarged view of portion A shown in FIG. 7, showing another modified extending portion of the cushion pad in a battery module, according to some embodiments of the present disclosure.
Figure 10:
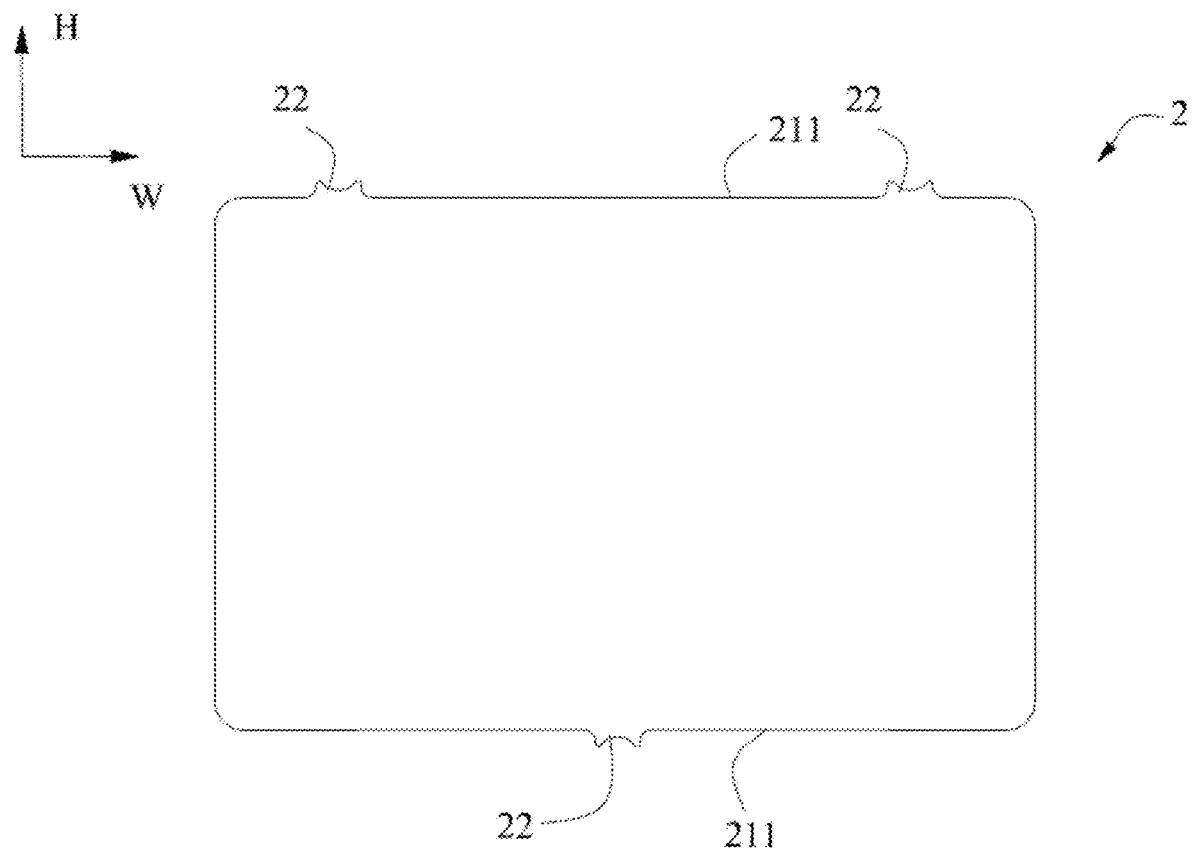
FIG. 10 is a planar view showing the cushion pad in the battery module, according to some embodiments of the present disclosure.

FIG. 1 is a partial exploded perspective view of a battery module, according to some embodiments of the present disclosure. FIG. 2 is a perspective view of the battery module of FIG. 1 from another view angle in which the heat exchange plate is not shown, according to some embodiments of the present disclosure. FIG. 3 is a perspective view of the assembled battery and cushion pad of the battery module shown in FIG. 1, according to some embodiments of the present disclosure. FIG. 4 is a side view of FIG. 3, according to some embodiments of the present disclosure. FIG. 5 is a perspective view of an embodiment of a cushion pad of the battery module shown in FIG. 1, according to some embodiments of the present disclosure. FIG. 6 is a planar view of the cushion pad of the battery module shown in FIG. 5, according to some embodiments of the present disclosure. FIG. 7 is a planar view of another embodiment of the cushion pad of the battery module, according to some embodiments of the present disclosure. FIG. 8 is an enlarged view of portion A shown in FIG. 7, showing a modification of the extending portion of the cushion pad of the battery module, according to some embodiments of the present disclosure. FIG. 9 is an enlarged view of portion A shown in FIG. 7, showing another modification of the extending portion of the cushion pad of the battery module, according to some embodiments of the present disclosure. FIG. 10 is a planar view showing another embodiment of the cushion pad of the battery module, according to some embodiments of the present disclosure.

The battery module of the present disclosure can include a plurality of batteries 1 arranged in sequence along the length direction L and a cushion pad 2 disposed between two adjacent batteries 1 along the length direction L. The battery module can further include a heat exchange plate 3, which can be disposed and fixed to the lower side of the plurality of batteries 1 in a height direction H.

The type of battery can include, but is not limited to, lithium ion battery, aluminum ion battery, carbon battery, flow battery, lead-acid battery, glass battery, magnesium ion battery, metal air battery, molten salt battery, nickel cadmium battery, nickel hydrogen battery, nickel iron battery, nickel metal hydride battery, nickel zinc battery, organic radical battery, polymer-based battery, fuel cell, lithium sulfur battery, sodium ion battery, sodium sulfur battery, and zinc ion battery. In some embodiments, the battery is a lithium ion battery.

In some embodiments, battery 1 can be a hard-shell battery (or referred to as a can-type battery) including an electrode assembly (not shown), a casing 11, a top cover 12, an electrode 13 and an explosion-proof valve 14. Casing 11 can include a bottom surface 111 and a large surface 112, and the inside of the casing 11 can form a receiving cavity to receive an electrode assembly and an electrolyte. The electrode assembly can include a positive electrode sheet, a negative electrode sheet, and a separator that spaces the positive electrode sheet apart from the negative electrode sheet. The electrode assembly can be formed by means of winding a positive electrode sheet, a negative electrode sheet and a separator, or laminating a positive electrode sheet, a negative electrode sheet and a separator. The positive electrode sheet and the negative electrode sheet can each include a current collector and an active material layer disposed on the current collector.

In some embodiments, cushion pad 2 can include a main body portion 21 and an extending portion 22. Extending portion 22 can extend outward from an end surface 221 of main body portion 21 in the height direction H. Extending portion 22 can include a concave portion 221 and a convex portion 222, wherein the convex portions 222 can be located on two sides of extending portion 22 and protrude outward in a width direction W. Concave portions 221 can be located between convex portions 222 in the width direction W and recess inward with respect to convex portions 222. The term "outward" herein can refer to a direction close to main body portion 21 and the term "inward" can refer to a direction away from main body portion 21.

When cushion pad 2 is subjected to a pressing force in the length direction L, due to the principle that the resistance is minimum when a deformation occurs, extending portion 22 can deform before end surface 211 of main body portion 21. In addition, the pressing force received by cushion pad 2 can be concentrated to concave portion 221 and convex portion 222 of extending portion 22, such that concave portion 221 of extending portion 22 can be deformed by the force to protrude outward. Convex portions 222 on both sides of concave portion 221 can be deformed in the width direction W as pressed by concave portion 221, and the deformation is larger than the overall deformation of cushion pad 2 in the height direction H, so that cushion pad 2 does not exceed the corresponding surface (that is, the corresponding bottom surface 111 or top surface 121) of battery 1 in the height direction. Thus, it does not affect the flatness of the corresponding surface of battery 1 in the height direction H.

Cushion pad 2 is usually made of an elastic compressible material, which ensures that each battery 1 has sufficient expansion space to prevent lithium precipitation and capacity diving in the case where battery 1 is a lithium ion battery. Examples of the elastic material can include, but not limited to an elastomer such as polyurethane, rubber, and a heat dissipation sheet of silicon or non-silicon. Cushion pad 2 can also function as a heat insulator. The main body portion of cushion pad 2 can have a flat plate structure.

Extending portion 22 can be provided in various ways. For example, extending portion 22 can be provided only on end surface 211 of the lower side of main body portion 21 in the height direction H, or extending portion 22 can be provided only on end surface 211 of the upper side of main body portion 21 in the height direction H. As shown in FIGS. 1 to 7 and 10, extending portion 22 can be provided on both end surface 211 of upper side of main body portion 21 in the height direction H and end surface 211 of the lower side of main body portion 21 in the height direction H. In addition, the number of extending portions 22 can be one or more. In some embodiments shown in FIGS. 1 to 7, end surface 211 on the lower side of main body portion 21 in the height direction H and end surface 211 on the upper side of main body portion 21 in the height direction H each can be provided with two extending portions 22. In the embodiment shown in FIG. 10, one extending portion 22 is provided on the end surface 211 on the lower side of main body portion 21 in the height direction H, and two extending portions 22 are provided on end surface 211 on the upper side of main body portion 21 in the height direction H. However, the number of extending portions 22 is not limited thereto, and can be set according to specific applications and needs thereof. In addition, the arrangement of extensions 22 may can be selected according to design requirements.

In reference to FIGS. 1 to 10, end portion 211 of the lower side of main body portion 21 in the height direction H can be provided with extending portion 22. In the case where the battery module is fixed by applying glue to the bottom portions of the plurality of batteries 1, if cushion pad 2 is pressed in the length direction L, due to the presence of concave portion 221 and convex portion 222 of extending portion 22, cushion pad 2 can be ensured that its lowest surface does not exceed bottom surface 111 of battery 1, so as to ensure that the bottom glue layer of battery 1 is flat, and the glue layer is even, such that the bonding strength is uniform and the bonding effect is firm. Moreover, convex portion 222 of extending portion 22 and end surface 211 on the lower side of main body portion 21 in the height direction H can form a notch G, and notch G can correspond to a glue overflow space. When glue is applied on the bottom, the glue can overflow to this space. In the case where the battery module receives an impact force in the length direction L, a tangential force provided by the glue layer can weaken the impact force to the battery module. In the case where heat exchange plate 3 is disposed on the lower side of the plurality of batteries 1 to realize heat exchange of battery 1, the lowest surface of cushion 2 does not exceed bottom surface 111 of battery 1 when being pressed, and thus does not affect the flatness of the bottom portions of the plurality of batteries 1. As a result, the heat exchange efficiency is not reduced, and the impact of cushion pad 2 on the heat exchange efficiency is excluded. End surface 211 on the upper side of the main body portion 21 in the height direction H can also be provided with an extending portion 22, due to the presence of concave portion 221 and convex portion 222 of extending portion 22, it is ensured that the highest surface of cushion pad 2 does not exceed top surface 121 of battery 1, and thus does not interfere with the installation of other components of the battery module.

As shown in FIGS. 1 to 7, extending portion 22 can be provided on end surface 211 on the upper side of main body portion 21 in the height direction H and extending portion 22 provided on end surface 211 on the lower side of main body portion 21 in the height direction H can be in mirror symmetry with respect to main body portion 21, accordingly even if cushion pad 2 is mounted upside down, it does not affect its function, such that versatility is further improved.

In reference to FIGS. 6 and 7, the angle Φ between end surface 211 of main body portion 21 in the height direction H and extending portion 22 is not more than about 90°. In FIG. 6, the angle Φ can be a right angle, and the angle Φ in FIG. 7 can be an acute angle. When concave portion 221 is deformed when cushion pad 2 is pressed, due to the deformation, concave portion 221 can protrude outward, concave portion 221 is thus flattened, convex portions 222 located on both sides of concave portion 221 can become more easily pressed by concave portion 221 along the width direction W, and thus deform toward both sides, so that the displacement of convex portion 222 in the height direction H is small. It is thus reliably ensured that an apex P of extending portion 22 of cushion pad 2 does not exceed the corresponding surface of battery 1 in the height direction H, that is, the corresponding bottom surface 111 or top surface 121. Accordingly, the flatness of the corresponding surface of battery 1 in the height direction H is not affected.

Due to the limitation of the mold at the time of molding, main body portion 21 can be provided with a chamfer or rounded corner between end surface 211 in the height direction H and extending portion 22. As shown in FIGS. 4 to 10, a rounded corner can be provided between end surface 211 of main body portion 21 in the height direction H and extending portion 22. The chamfering or rounding design is also able to avoid the stress concentration at a sharp corner.

As shown in FIGS. 3 to 7 and FIGS. 9 and 10, the surface of concave portion 221 can be a curved surface. As shown in FIG. 8, it can also be a flat surface. When cushion pad 2 is pressed, the surface of the curved surface of concave portion 221 can deform to protrude outward, and convex portions 222 located on both sides of concave portion 221 can deform by the pressing force of concave portion 221 toward both sides in the width direction W to an extent greater than the upward or downward deformation of convex portion 222 in the height direction H caused by cushion pad 2 is pressed as a whole. Thus, it is reliably ensured that apex P of extending portion 22 of cushion pad 2 does not exceed the corresponding surface of battery 1 in the height direction H. The flat surface of concave portion 221 can make its forming process easier, so as to reduce the processing difficulty and the production costs as well.

As shown in FIGS. 3 to 8 and 10, the outer surface of convex portion 222 can be a curved surface. As shown in FIG. 9, it can also be a flat surface. Taking extending portion 22 on end surface 211 disposed on the lower side of main body portion 21 in the height direction H as an example, the flat outer surface makes the flatness of convex portion 222 in contact with the bottom of the battery module better. Although a curved outer surface allows convex portion 222 to have a small contact area with the bottom of the battery module, its contact flatness may not as good as the flat outer surface. However, it is also noted that a curved outer surface is favorable for guiding the glue overflow in the process when the bottom is applied with glue.

FIG. 8 shows the surface of concave portion 221 as a flat surface, and a rounded corner can be provided between convex portion 222 and concave portion 221. Alternatively, a chamfer can be provided between convex portion 222 and concave portion 221. In this way, it can prevent a concentrated stress caused by sharp changes in size, so as to improve the service life of cushion pad 2.

In reference to FIG. 7, the height H1 at which concave portion 221 recesses inward in the height direction H can be smaller than the height H2 at which convex portion 222 protrudes from end surface 211 of main body portion 21 in the height direction H. The existence of such a height difference satisfies the requirement that concave portion 221 does not protrude beyond convex portion 222 when protruding in the height direction H at the time of pressing, does not exceed the corresponding surface of battery 1 in the height direction H, and can secure the protrusion strength.

When designing or installing cushion pad 2, apex P of convex portion 222 of extending portion 22 of cushion pad 2 can be made not to exceed the corresponding surface of battery 1 in the height direction H, which is the corresponding bottom surface 111 or top surface 121.

In summary, when cushion pad 2 is subjected to a pressing force in the length direction L, the pressing force received by cushion pad 2 is concentrated on concave portion 221 and convex portion 222 of extending portion 22, so that concave portion 221 of extending portion 22 is deformed by the force to protrude outward, convex portions 222 located on both sides of concave portion 221 are further deformed by concave portion 221 in the width direction W to an extent greater than the deformation of cushion pad 2 as a whole in the height direction H, so that cushion pad 2 does not exceed the corresponding surface of battery 1 in the height direction H, and thus does not affect the flatness of the corresponding surface of battery 1 in the height direction H.

The above detailed description describes various exemplary embodiments of the present disclosure, but the present disclosure is not limited to the specifically disclosed embodiments. Accordingly, the various features disclosed herein can be combined together to form a plurality of additional combinations that are not shown for the sake of clarity.

The above description only includes some embodiment of the present application, and is not intended to limit the present application. Various changes and modifications may be made to the present application. Any modifications, equivalent substitutions, improvements, and the like made within the spirit and principle of the present application fall within the scope of protection of the present application.

While the disclosure has been described in connection with certain embodiments, it is to be understood that the disclosure is not to be limited to the disclosed embodiments but, on the contrary, is intended to cover various modifications and equivalent arrangements included within the spirit and scope of the disclosure, which scope is to be accorded the broadest interpretation so as to encompass all such modifications and equivalent structures as is permitted under the law.

What is claimed is:

1. A battery module, comprising:
   (a) a plurality of batteries arranged sequentially in a length direction; and
   (b) a cushion pad made of an elastic compressible material disposed between two adjacent batteries in the length direction;
   the cushion pad comprising:
   a main body portion; and an extending portion extending outwardly from an end surface of the main body portion in a height direction and arranged on the end surface on a lower side of the main body portion in the height direction;

the extending portion comprising:
- a pair of convex portions arranged in a width direction from two sides of the extending portion and protruding outwardly in the height direction; and
- a concave portion located between the pair of convex portions and recessed inwardly in the height direction with respect to the pair of convex portions, when the cushion pad is pressed, its deformation leads to formation of an apex from the extending portion, wherein the apex and the main body portion do not exceed a corresponding surface of the battery in the height direction.

2. The battery module according to claim 1, wherein a surface of the concave portion is a curved surface.

3. The battery module according to claim 1, wherein a surface of the concave portion is a flat surface.

4. The battery module according to claim 1, wherein a chamfer or a rounded corner is provided between the pair of convex portions and the concave portion.

5. The battery module according to claim 1, wherein an angle between the end surface of the main body portion in the height direction and the extending portion is not more than about 90°.

6. The battery module according to claim 1, wherein a chamfer or a rounded corner is provided between the end surface of the main body portion and the extending portion in the height direction.

7. The battery module according to claim 1, wherein the height at which the concave portion recesses inward in the height direction is smaller than the height at which the pair of convex portions protrudes from the end surface of the main body portion in the height direction.

8. The battery module according to claim 1, wherein an outer surface of the pair of convex portions is a curved surface.

9. The battery module according to claim 1, wherein the extending portion is arranged on the end surface on an upper side of the main body portion in the height direction.

10. The battery module according to claim 1, wherein:
the end surface on the upper side of the main body portion in the height direction and the end surface on the lower side of the main body portion in the height direction each are provided with separate extending portions.

11. The battery module according to claim 10, wherein:
the extending portion arranged on the end surface on the upper side of the main body portion in the height direction and the extending portion arranged on the end surface on the lower side of the main body portion in the height direction are in mirror symmetry with respect to the main body portion.

12. The battery module according to claim 1, wherein the battery module comprises a heat exchange plate disposed and fixed to a lower side of the plurality of batteries in the height direction.

* * * * *